(12) United States Patent
Moothoor et al.

(10) Patent No.: US 11,210,129 B2
(45) Date of Patent: Dec. 28, 2021

(54) EXTENDED ARCHITECTURE AS A SERVICE TO INTEGRATE RESOURCE AND TRANSACTION MANAGERS

(71) Applicant: International Business Machines Corporation, Armonk, NY (US)

(72) Inventors: Jithesh Moothoor, S. Medahalli (IN); Nageswararao V. Gokavarapu, Bangalore (IN); Raghavendran Srinivasan, Bangalore (IN); Arpana K. Vishweshwarappa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 16/008,922

(22) Filed: Jun. 14, 2018

(65) Prior Publication Data
US 2019/0384628 A1    Dec. 19, 2019

(51) Int. Cl.
*G06F 9/46*        (2006.01)
*G06F 9/50*        (2006.01)

(52) U.S. Cl.
CPC .............. *G06F 9/466* (2013.01); *G06F 9/461* (2013.01); *G06F 9/5005* (2013.01)

(58) Field of Classification Search
CPC ......... G06F 9/461; G06F 9/466; G06F 9/5005
See application file for complete search history.

(56) References Cited

U.S. PATENT DOCUMENTS

| 5,768,587 A * | 6/1998 | Freund | G06F 9/466 |
| | | | 714/19 |
| 6,157,927 A * | 12/2000 | Schaefer | G06F 9/466 |
| 6,463,456 B1 * | 10/2002 | Kan | G06F 9/466 |
| | | | 709/201 |
| 8,650,272 B2 * | 2/2014 | Myers | G06F 11/1474 |
| | | | 709/223 |

(Continued)

OTHER PUBLICATIONS

X/Open Company Limited, X/Open CAE Specification, Distributed Transaction Processing: The XA Specificiation, pp. 1-80 (Dec. 1991). (Year: 1991).*

(Continued)

*Primary Examiner* — Jorge A Chu Joy-Davila
(74) *Attorney, Agent, or Firm* — Heslin Rothenberg Farley & Mesiti P.C.; Edward Wixted, Esq.

(57) ABSTRACT

A method, computer program product, and a system where a processor(s), executing extended architecture as a service, obtains a request from an extended architecture compliant transaction manager, to execute a transaction affecting a resource manager not supported by the transaction manager, where the resource managed by the resource manager is selected from the group consisting of: an extended architecture compliant resource, and an extended architecture non-compliant resource, where the request comprises a transaction identifier, and where the transaction comprises extended architecture compliant calls. The processor(s) generates a connection, from the extended architecture as a service to the resource manager, where the connection comprises a connection identifier. The processor(s) main- (Continued)

tains, in a log, the connection identifier, the transaction identifier, and a state of the transaction. The processor(s) executes the transaction on the resource managed by the resource manager, via the connection.

19 Claims, 9 Drawing Sheets

(56) References Cited

U.S. PATENT DOCUMENTS

| | | | |
|---|---|---|---|
| 2008/0250074 A1 | 10/2008 | Parkinson | |
| 2008/0320020 A1* | 12/2008 | Ramidi | G06F 16/27 |
| 2012/0042314 A1 | 2/2012 | Aydin et al. | |
| 2014/0157276 A1* | 6/2014 | Smithson | G06F 9/466 |
| | | | 718/101 |
| 2015/0309889 A1* | 10/2015 | Campbell | G06F 11/1474 |
| | | | 714/16 |
| 2016/0294726 A1* | 10/2016 | Parkinson | G06F 9/466 |
| 2020/0272620 A1* | 8/2020 | Zhang | G06Q 20/00 |

OTHER PUBLICATIONS

KnowledgeShop, Transaction Management, 2016, fizalihsan.github.io/technology/transaction.html (Year: 2016).*

Mell et al., "The NIST Definition of Cloud Computing", National Institute of Standards and Technology, U.S. Dept. of Commerce, NIST Special Publ. 800-145, Sep. 2011, 7 pages.

Christian Tzolov, "Global Transactions with Narayana JTA and Geode as Last-Resource Commit Optimization", Apache Software Foundation, Jul. 14, 2017, cwiki.apache.org, 8-pages.

* cited by examiner

EXTENDED ARCHITECTURE AS A SERVICE TO INTEGRATE RESOURCE AND TRANSACTION MANAGERS

BACKGROUND

Extended architecture (XA) is a specification for distributed transaction processing (DTP) that described and interface between a global transaction manager and a local resource manager. A resource manager can be understood as a gatekeeper to a recoverable resource, which is any resource with recorded recovery information that can be recovered by backing out (i.e., backout). Thus, the resource manager handles the accesses to the resource, including backing out of changes implemented by a transaction executed in a transaction manager. Implementing the XA standard enables multiple resources, including but not limited to, databases, application servers, message queues, and transactional caches, to be accessed within the same transaction. Accessing these resources in the same transaction preserves ACID (atomicity, consistency, isolation, and durability) properties across applications. An operation that preserves ACID properties is valid, even in the event of errors, power failures, etc. In the context of databases, a sequence of database operations that satisfies the ACID properties is referred to as a transaction, a single logical operation on the data. ACID transactions are a key feature of databases, but typically databases only provide the ACID guarantees for activities that happen inside a single database. However, XA coordination allows many resources (e.g., databases) to participate in a single, coordinated, atomic update operation.

XA is a standard for executing a so-called "global transaction," in that the transaction accesses more than one back-end data-store. XA specifies how a transaction manager will roll up the transactions against the different data-stores into an atomic transaction and execute this atomic transaction with a two-phase commit (2PC) protocol for the transaction. The two phases in the 2PC protocol refer to: 1) a commit-request phase (or a voting phase), and 2) a commit phase. In the first phase, program code executing on a processing resource (e.g., a coordinator process) attempts to prepare the processes that comprise a transaction (e.g., participants, cohorts, and/or workers) to take the necessary steps for either committing or aborting the transaction and to vote (indicate), either to commit the transaction, if the transaction participant's local portion execution has ended properly, or to abort, if a problem has been detected with the local portion. The votes can be understood as a binary "yes" (to commit) or "no" (to abort). In the second phase, the program code (e.g., a coordinator) determined whether to commit the transaction, based on all the participants voting to commit, or to abort the transaction, in any other situation. The program code notifies the participants of the determination and based on the notification, the participants execute actions with their local transactional resources (i.e., recoverable resources, including database data) and their respective portions in the transaction's other output (if applicable) in order aid in committing or aborting (e.g., rolling back) the transaction. Thus, in accessing different data-stores, program code compliant with the XA standard utilizes the 2PC protocol to ensure that all resources (i.e., the more than one back-end data-store) either commit or roll back any particular transaction consistently (i.e., all the resources either commit or roll back the transaction). A resource manager that follows the XA specification is referred to as XA-compliant.

Transactions consistent was the XA standard are particularly useful in distributed computing system, including but not limited to, cloud computing environments. Current prevalent computing environments include data is spanned across multiple resource managers, which can be spread across different geographies and heterogeneous systems. Adherence to the XA standard achieves data consistency in this complex architecture because XA transactions are designed to allow distributed transactions (i.e., where a transaction manager controls a transaction, which involves multiple resources). In an XA transaction, a transaction manager coordinates its accesses to the multiple resources, as noted above, utilizing the 2PC protocol to ensure data consistency, which is supported by the individual resource managers. The XA interface defines how the transaction resolution is decided by the transaction manager. To that end, transaction managers, utilizing the 2PC protocol, maintain transactions spread across multiple distinct resource managers, including but not limited to, DB2, Oracle, Sybase, Informix, Microsoft SQL Server.

Not all resource managers for various back-end data stores support the XA standard. Not only do many databases not support 2PC protocol, some databases do not support XA interfaces in the programming language of a Trusted Platform Module (TPM). Additionally, resources that are XA compliant may be difficult to access in a global transaction because even resources that are XA complaint may have diverse (and incompatible) implementations and invocations. The diversity of resources and the variety of compliance and non-compliance of these resources with XA represents a challenge in enabling real-time applications to achieve 2PC when data is spread across combination of resource managers.

SUMMARY

Shortcomings of the prior art are overcome and additional advantages are provided through the provision of a method for executing transactions by an extended architecture compliant transaction manager on resources that may or may not be extended architecture compliant. The method includes, for instance: obtaining, by one or more processors executing program code to provide extended architecture as a service, a request from an extended architecture compliant transaction manager, to execute a transaction affecting a resource manager not supported by the transaction manager, wherein the resource manager manages a resource selected from the group consisting of: an extended architecture compliant resource, and an extended architecture non-compliant resource, wherein the request comprises a transaction identifier, and wherein the transaction comprises extended architecture compliant calls; generating, by the one or more processors, a connection, from the extended architecture as a service to the resource manager, wherein the connection comprises a connection identifier; maintaining, by the one or more processors, in a log, the connection identifier, the transaction identifier, and a state of the transaction; executing, by the one or more processors, the transaction on the resource managed by the resource manager, via the connection, the executing comprising: transforming, by the one or more processors, the extended architecture compliant calls into calls in a format acceptable to the resource manager; transmitting, by the one or more processors, the transformed calls to the resource manager, for execution on the resource; obtaining, by the one or more processors, a response, from the resource manager, based on the execution on the resource of the transformed calls; transforming, by the one or more processors, the response, from the format acceptable to the resource manager to an extended architecture compliant response; and transmitting, by the one or more processors, the transformed response to the transaction manager.

Shortcomings of the prior art are overcome and additional advantages are provided through the provision of a computer program product for executing transactions by an extended architecture compliant transaction manager on resources that may or may not be extended architecture compliant. The computer program product comprises a storage medium readable by a processing circuit and storing instructions for execution by the processing circuit for performing a method. The method includes, for instance: obtaining, by the one or more processors executing program code to provide extended architecture as a service, a request from an extended architecture compliant transaction manager, to execute a transaction affecting a resource manager not supported by the transaction manager, wherein the resource manager manages a resource selected from the group consisting of: an extended architecture compliant resource, and an extended architecture non-compliant resource, wherein the request comprises a transaction identifier, and wherein the transaction comprises extended architecture compliant calls; generating, by the one or more processors, a connection, from the extended architecture as a service to the resource manager, wherein the connection comprises a connection identifier; maintaining, by the one or more processors, in a log, the connection identifier, the transaction identifier, and a state of the transaction; executing, by the one or more processors, the transaction on the resource managed by the resource manager, via the connection, the executing comprising: transforming, by the one or more processors, the extended architecture compliant calls into calls in a format acceptable to the resource manager; transmitting, by the one or more processors, the transformed calls to the resource manager, for execution on the resource; obtaining, by the one or more processors, a response, from the resource manager, based on the execution on the resource of the transformed calls; transforming, by the one or more processors, the response, from the format acceptable to the resource manager to an extended architecture compliant response; and transmitting, by the one or more processors, the transformed response to the transaction manager.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
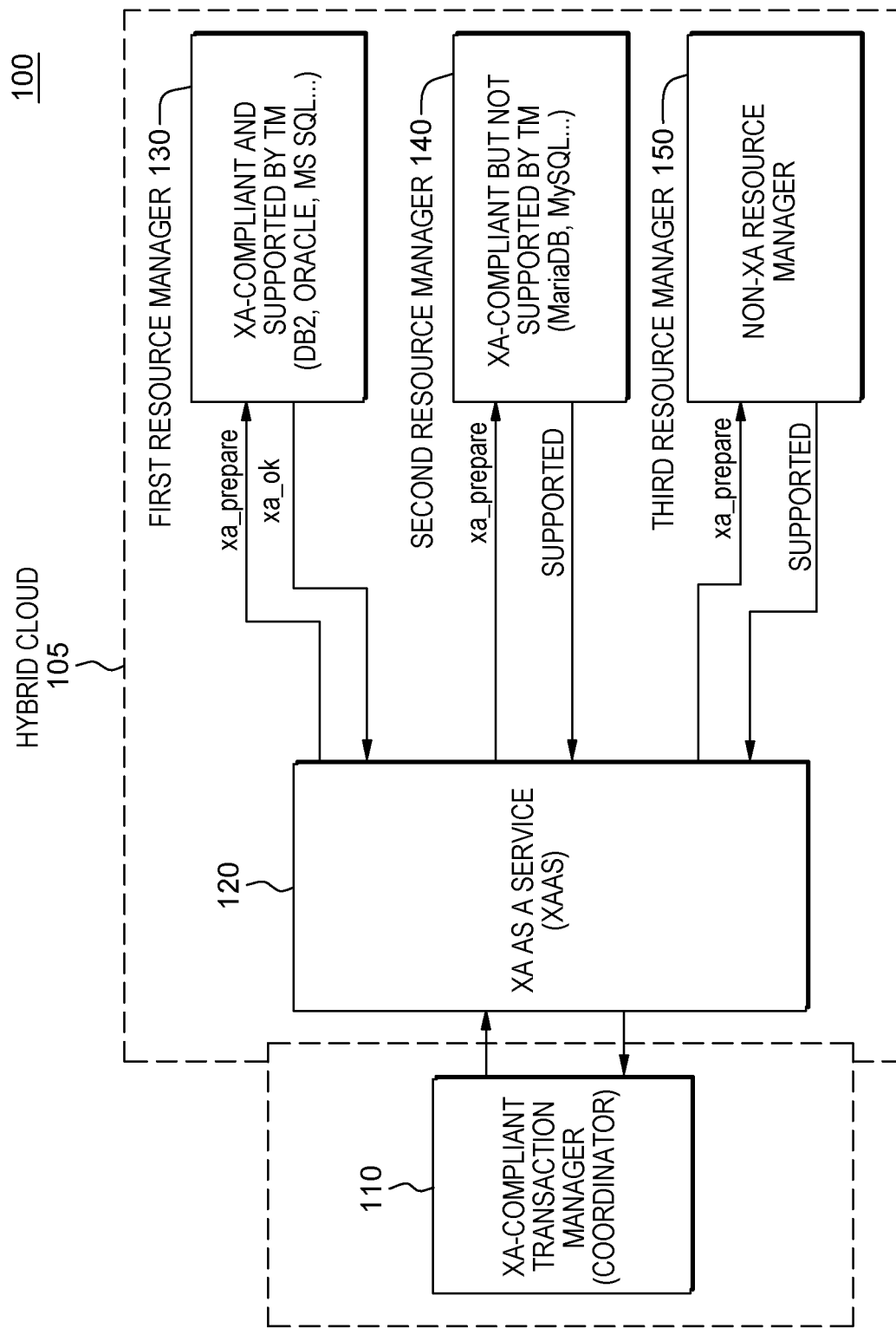
FIG. 1 is an illustration of various aspects of an environment in which aspects of embodiments of the present invention may be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
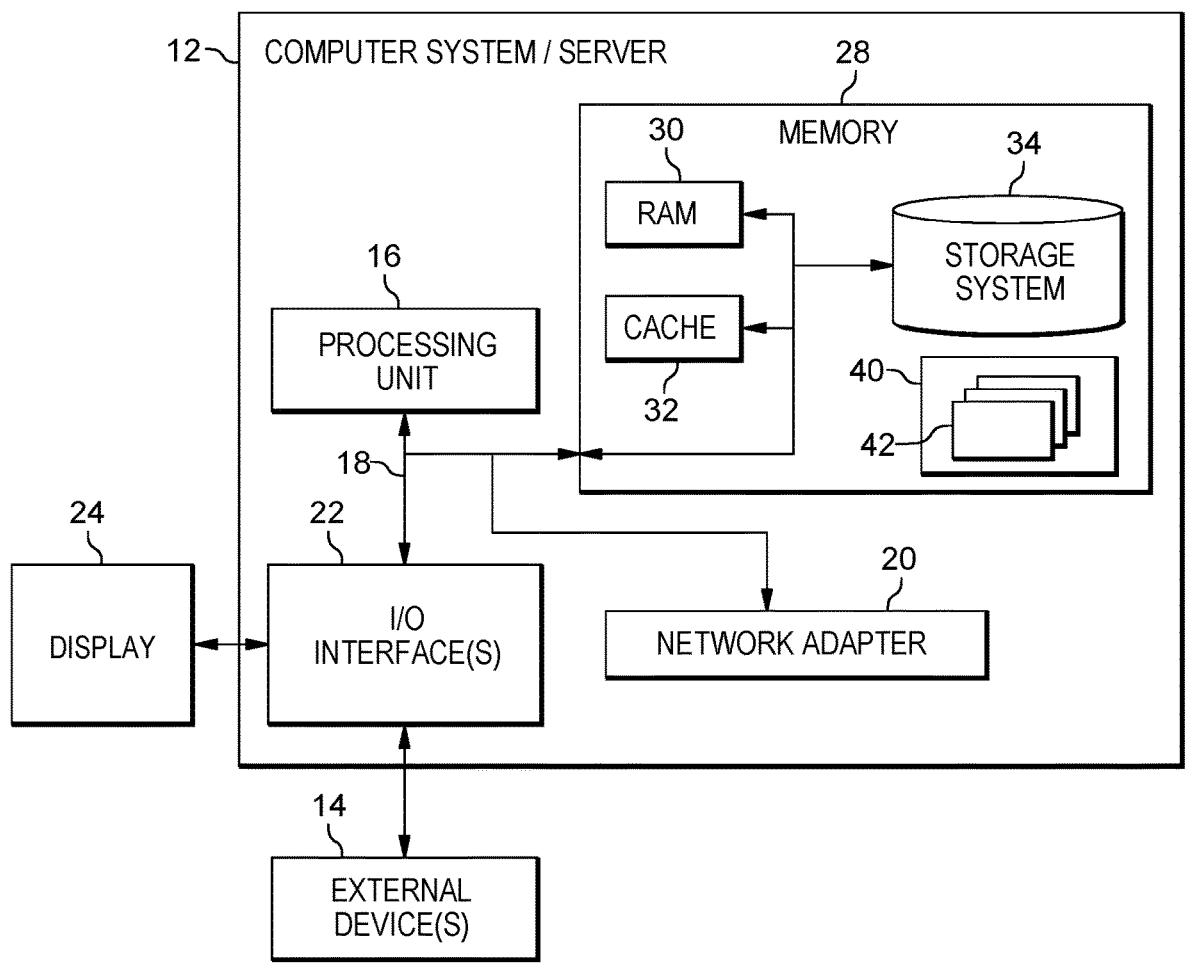
FIG. 7 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

Embodiments of the present invention include a computer-implemented method, a computer program product, and a computer system that include program code executed on at least one processing circuit that provides XA as a service (XAAS) such that resource managers that both comply and do not comply with this standard can be accessed in a global transaction that satisfies the ACID properties. In embodiments of the present invention, the XAAS offering enables a seamless integration of disparate resources. The common XAAS interface of embodiments of the present invention includes program code that manages XA connections to facilitate transaction resolution between a transaction manager and different resource managers (associated with various back-end resources accessed in a global transaction. The XAAS facilitated by program code in embodiments of the present invention enables any resource manager to participate in a given transaction. Thus, embodiments of the present invention provide a common transaction resolution interface for a distributed management system (e.g., a cloud computing environment) that is spread across multiple distinct resource managers and transaction managers. As understood by one of skill in the art, XAAS can be implemented in accordance with aspects of the present invention as a middleware and can be integrated into existing middleware products.

In embodiments of the present invention, by utilizing the XAAS interface, a transaction manager may adhere to a 2PC protocol, coordinated by the program code across all resource managers involved in a transaction. In some embodiments of the present invention, to execute consistent global transactions in the XA standard that comply with the 2PC protocol across all resources, the program code: 1) determines, at the initiation of a transaction by a transaction manager, if any unsupported resource managers are involved in the transaction; 2) connects unsupported resource managers to a service (e.g., XAAS) to a service, optionally utilizing a service module and manages the connections from the different resource managers through a common interface (i.e., the XAAS interface), including resolving all calls from the transaction manager to unsupported resource managers through the service; and 3) initiates 2PC through the XAAS interface, so that this service facilitates the resolution of transactions between the transaction manager and resource managers, including unsupported resource managers.

Embodiments of the present invention are inextricably tied to computing at least because they are directed to facilitating transaction resolution between different transaction managers and resource managers (both XA compliant, with varied implementations, and non-XA compliant) in a distributed computing environment, where a global transaction is initiated and to complete, accesses varied resources, managed by these resource managers. Additionally, embodiments of the present invention provide something more than existing approaches to transaction resolution in distributed environments at least because, in some embodiments of the present invention, program code executed by at least one processing resource facilitates this resolution in part by generating a common interface to provide XA as a service (XAAS) in order to seamlessly integrate the various resource managers or transaction managers to achieve 2PC.

Aspects of embodiments of the present invention provide advantages over existing approaches to transaction resolution between different transaction managers and resource managers, where the resource managers are both XA compliant and not XA compliant. For example, existing approaches do not enable 2PC or the consistency (ACID) afforded by this approach to transaction resolution. For example, in one existing approach, the program code skips the first 2PC phase (e.g., the preparation phase) for resource managers that are not XA-compliant and resolves the transactions for the associated resources at the commit (second) phase by verifying the transaction logs at resource manager side. Thus, unlike embodiments of the present invention, which achieve a 2PC (two phase commit) when executing a general transaction on resources that are both XA-compliant and not XA-compliant, this existing approach circumvents the first phase for the not XA-compliant resources and instead uses a recoverable last resource commit option by maintaining the transaction logs in resource manager table. Hence, this existing approach does not include a seamless integration (e.g., through the XAAS interface) of multiple transaction managers and XA/non-XA resource managers. Other approaches to executing global transactions with varied back-end data sources mix usages of 2PC and 1PC protocols and therefore fail to provide the data consistency of embodiments of the present invention. Rather than integrate 1PC protocols with 2PC protocols, embodiments of the present invention provide a common XA interface to seamlessly integrate with multiple transaction managers and XA/non-XA resource managers utilizing a 2PC protocol.

FIG. 1 depicts a technical environment 100, which is a distributed computing environment, where aspects of embodiments of the present invention can be implemented. As will be discussed herein, FIG. 1 illustrates one or more program, in an embodiment of the present invention: 1) providing XA as a service 120, XAAS, to (seamlessly) integrate an resource managers 130 140 150 that are both compatible and incompatible with one or more of XA and a transaction manager 110; 2) facilitating transaction resolution between a given transaction manager 110 and different resource managers 130 140 150; and 3) managing XA for resource managers 130 140 150 participating in a transaction. The distributed environment of FIG. 1 includes a hybrid cloud computing system 105, where the transaction manager 110 and the resource managers 130 140 150 are all resident.

In the technical environment 100 of FIG. 1, the transaction manager 110 executes program code, resolves transactions, and resolves and recovers transactions. Thus, when one or more programs initiate a transaction at the transaction manager 110, the one or more programs, as part of executing the transaction, determine if the transaction involves accessing a resource managed by a resource manager that is not supported by the transaction manager 110. In this technical environment, the transaction manager is XA-compliant and resource managers associated with resources potentially accessed in a transaction may be: 1) XA-compliant and compliant with the transaction manager 110; 2) XA-compliant but not compliant with the transaction manager 110 (e.g., based on a different implementation); or 3) not XA-compliant, and, therefore, also not compliant with the transaction manager 110. For illustrative purposes, the hybrid cloud 105 of FIG. 1 includes three resource managers 130 140 150, all of which are accessed in a given transaction initiated by one or more programs at the transaction manager 110. A first resource manager 130 (e.g., DB2, Oracle, MS SQL, etc.) is XA-compliant and compatible with the transaction manager 110. A second resource manager 140 (e.g., MarioDB, MySQL, etc.) is XA-compliant but is not compatible with the transaction manager 110. A third resource manager 150 is neither XA-compliant nor compatible with the transaction manager 110. If a resource manager is either not compliant or not compatible with the transaction manager 110, it can be considered unsupported by the transaction manager 110.

In some embodiments of the present invention, if the one or more programs executing the transaction (which can be understood as an execution module of the transaction manager 110) determine that a resource manager involved in the transaction is not supported by the transaction manager 110, the one or more programs connect to the unsupported resource manager (e.g., the second resource manager 140 and/or the third resource manager 150), through an XAAS module 120. In some embodiments of the present invention, the one or more programs may initiate and maintain the XAAS module 120. In place of the transaction manager 110 accessing an unsupported resource manager directly to interact with a resource, to perform a (global) transaction, program code of the transaction manager 110 connects to the unsupported resource managers (e.g., the second resource manager 140 and/or the third resource manager 150) through the XAAS module 120. Once this connection through the XAAS module 120 is established, it continues to coordinate and connect the transaction manager 110 to each of the unsupported resource managers 140 150, throughout the execution and completion of the (global) transaction.

In embodiments of the present invention, the following interactions between the transaction manager and the unsupported resource managers 140 150 are handled through the XAAS module 120: 1) initiation of the transaction (as discussed above; 2) resolution of calls from the transaction manager 110 to the unsupported resource managers (e.g., the second resource manager 140 and/or the third resource manager 150); and 3) after program execution, initiation of a two phase protocol (2PC), which should pass through the XAAS. Generally speaking, the XAAS module 120 acts as an XA call transformer between the transaction manager 110 and the unsupported resource managers 140 150. The program code managing transactions utilizing the XAAS module 120, as well as the module itself, can be implemented as a middleware between transaction managers and resource managers in distributed computing environments. These implementations may be part of a proprietary middleware or may be implemented in existing transaction management middleware products, including but not limited to, Oracle Tuxedo, TPF, CICS, and/or Tmax.

Figure 2:
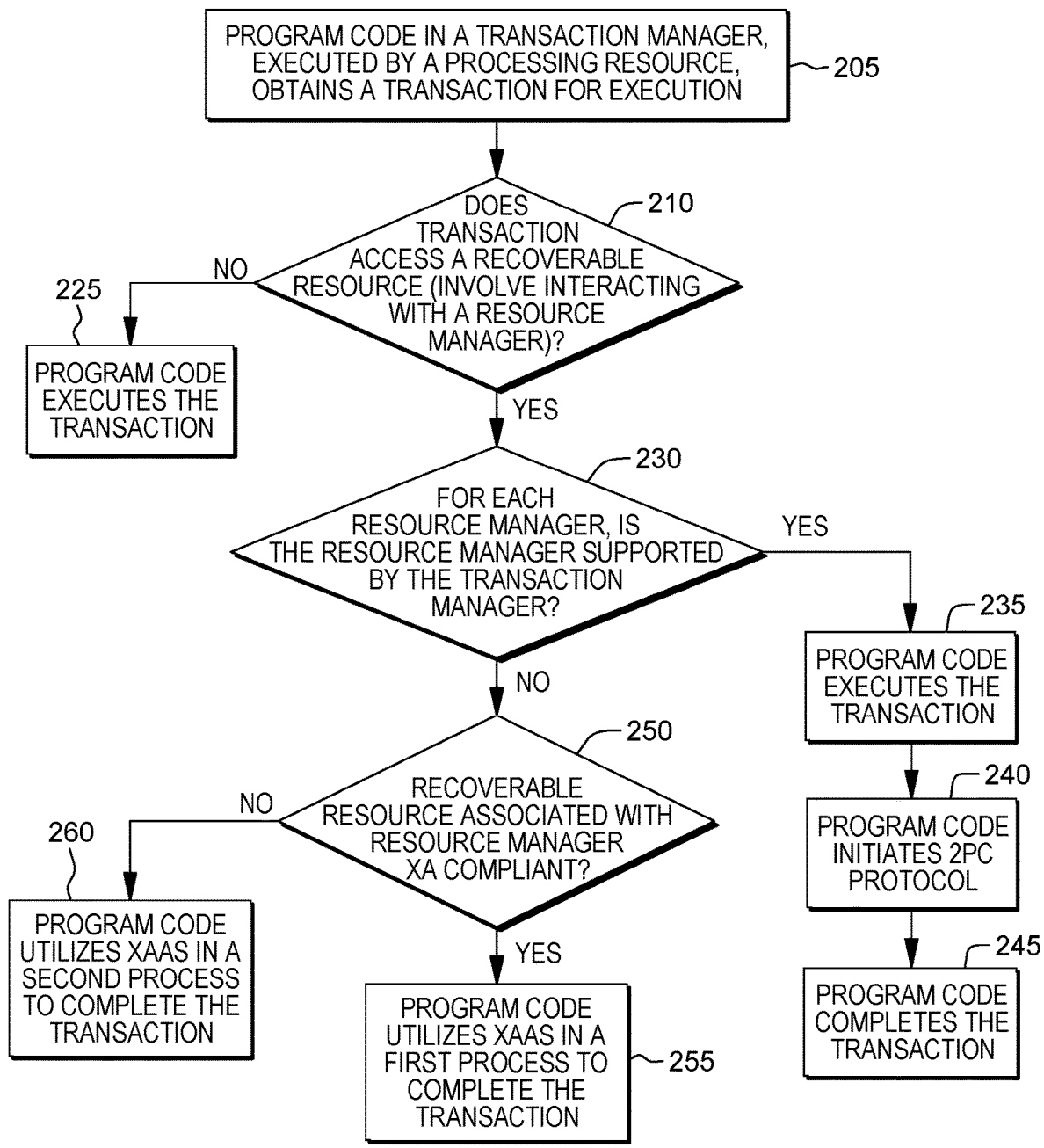
FIG. 2 is a workflow illustrating certain aspects of an embodiment of the present invention.

FIG. 2 is a workflow 200 that illustrates certain aspects of some embodiments of the present invention. In particular, the workflow 200 depicts the execution of a global transaction that accesses both supported and unsupported resources through the initiation and utilization of an integrative service. As explained above, this integrative service may include an XAAS module (e.g., FIG. 1, 120).

In an embodiment of the present invention, a program code in a transaction manager, executed by a processing resource, obtains a transaction for execution (205). As discussed above, the transaction may be a global transaction, meaning that executing the transaction will involve accessing multiple resources, where each (recoverable) resource has a resource manager as a gatekeeper.

In an embodiment of the present invention, the program code (of the transaction manager) determines whether the executing the transaction will access a recoverable resource (i.e., whether the transaction will involve interacting with a resource manager) (210). If there are no recoverable resource accessed, there will be no recovery, so maintaining the 2PC protocol is unnecessary. Thus, if the program code determines that executing the transaction does not include accessing a recoverable resource, the program code executes the transaction (225).

If the program code determines that executing the transaction does include accessing a recoverable resource, the program code then determines, for each resource manager associated with the recoverable resource(s) accessed in the transaction, if the resource manager is supported by the transaction manager (230). A resource manager that is supported by the transaction manager is one that is both XA compliant and has XA implemented in a manner that is compatible with the transaction manager. For each resource manager that the program code determines is supported by the transaction manager, the program code executes the transaction (235), initiates 2PC protocol (240), and completes the transaction (245).

Figure 3:
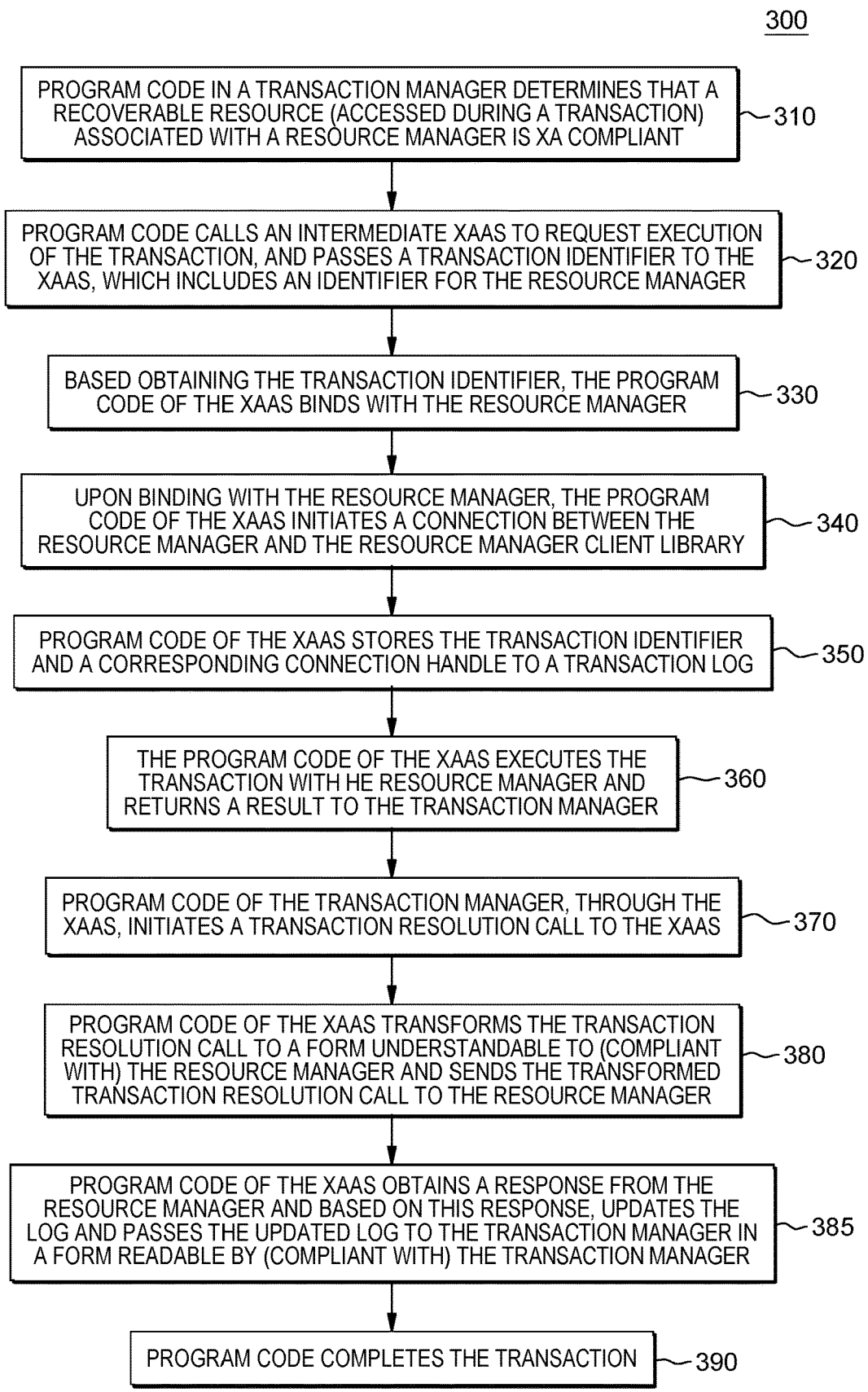
FIG. 3 is a workflow illustrating certain aspects of an embodiment of the present invention.
Figure 4:
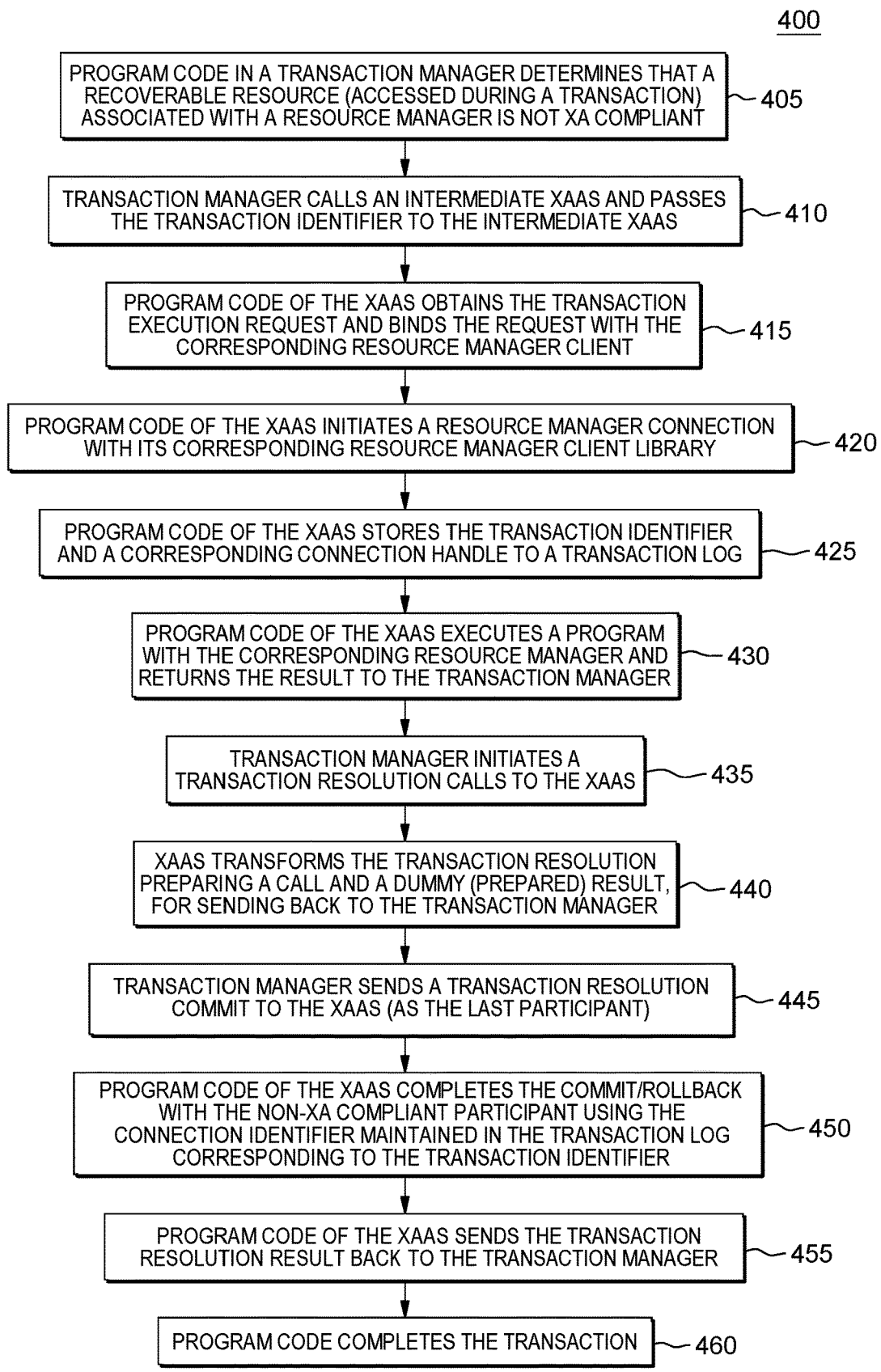
FIG. 4 is a workflow illustrating certain aspects of an embodiment of the present invention.

For each resource manager that the program code determines is not supported by the transaction manager, the program code determines if the recoverable resource associated with the resource manager is XA compliant (250). Whether or not an unsupported recoverable resource is associated with a resource manager that is XA compliant, the program code utilizes an XAAS to complete the transaction. However, the method performed by the program code differs depending on whether a resource manager is XA compliant. Thus, if the program code determines is the recoverable resource associated with the resource manager is XA compliant, the program code utilizes an XAAS in a first process (255) and if the program code determines is the recoverable resource associated with the resource manager is not XA compliant, the program code utilizes an XAAS in a second process (260). FIG. 3 illustrates a workflow 300 that is an example of this first process and FIG. 4 illustrates a workflow 400 that is an example of the second process.

Referring to FIG. 3, in an embodiment of the present invention, program code in a transaction manager determines that a recoverable resource (accessed during a transaction) associated with a resource manager is XA compliant (310). The program code calls an intermediate XAAS to request execution of the transaction, and passes a transaction identifier to the XAAS, which includes an identifier for the resource manager (320). Based obtaining the transaction identifier, the program code of the XAAS binds with the resource manager (330). In order to bind with the resource manager, the program code of the XAAS may specifically bind with a client of the resource manager. Upon binding with the resource manager, the program code of the XAAS initiates a connection between the resource manager and the resource manager client library (340). In an embodiment of the present invention, the program code of the XAAS stores the transaction identifier and a corresponding connection handle to a transaction log (350). The connection handle identifies the connection, including the driver and the data source.

In an embodiment of the present invention, the program code of the XAAS executes the transaction with the resource manager and returns a result to the transaction manager (360).

The program code of the transaction manager resolves the transaction. In order the resolve the transaction, the program code of the transaction manager, through the XAAS, initiates a transaction resolution call to the XAAS (370). The program code of the XAAS transforms the transaction resolution call (e.g., prepare, commit, rollback) to a form understandable to (i.e., compliant with) the resource manager and sends the transformed transaction resolution call to the resource manager (380). In an embodiment of the present invention, the program code of the XAAS obtains a response from the resource manager and based on this response, updates the log and passes the updated log to the transaction manager in a form readable by (compliant with) the transaction manager (385). The program code completes the transaction (390).

Referring to FIG. 4, in an embodiment of the present invention, program code in a transaction manager determines that a recoverable resource (accessed during a transaction) associated with a resource manager is not XA compliant (405). In an embodiment of the present invention, the transaction manager calls an intermediate XAAS and passes the transaction identifier to the intermediate XAAS (410). Program code of the XAAS obtains the transaction execution request and binds the request with the corresponding resource manager client (415). Program code of the XAAS initiates a resource manager connection with its corresponding resource manager client library (420). Upon initiating the connection, the program code of the XAAS stores the transaction identifier and a corresponding connection handle to a transaction log (425). The program code of the XAAS then executes a program with the corresponding resource manager and returns the result to the transaction manager (430). In an embodiment of the present invention, the transaction manager then initiates a transaction resolution calls to the XAAS (435). Upon receipt of this call, the XAAS transforms the transaction resolution preparing a call and a dummy (prepared) result, for sending back to the transaction manager (440). The transaction manager then sends a transaction resolution commit to the XAAS (as the last participant) (445). The program code of the XAAS completes the commit/rollback with the non-XA compliant participant using the connection identifier maintained in the transaction log corresponding to the transaction identifier (450). The program code of the XAAS sends the transaction resolution result back to the transaction manager (455). The transaction is completed (460).

Figure 5:
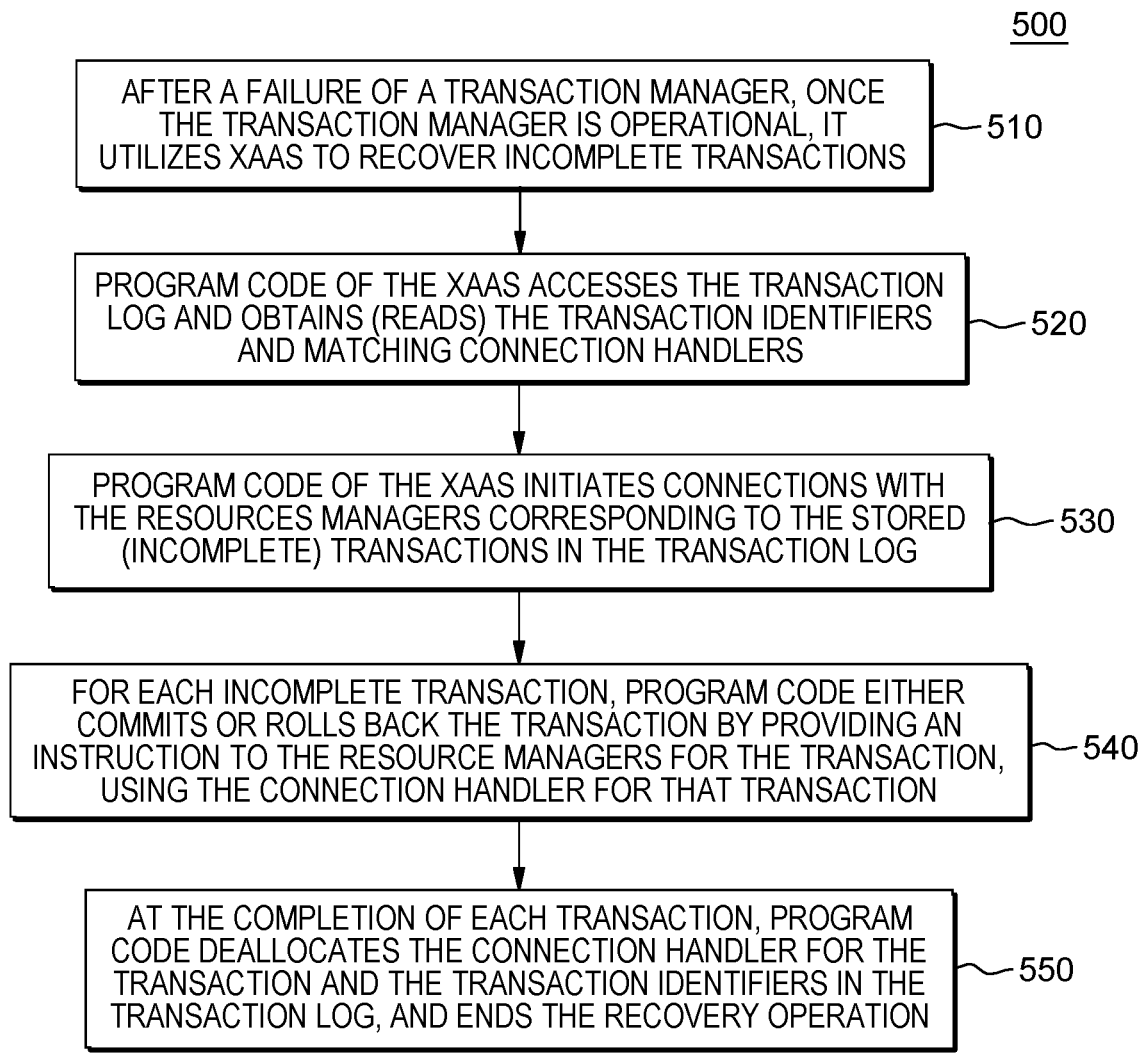
FIG. 5 is a workflow illustrating certain aspects of an embodiment of the present invention.

Should the transaction manager go down (fail, shut down, become unresponsive, etc.) when the transaction is on progress, in embodiments of the present invention, the program code initiates recovery when the transaction manager becomes available. To recover incomplete transactions, the transaction manager retrieves transaction identifiers from the XAAS. The transaction identifiers, as illustrated in FIG. 4, are stored in the transaction log. The records in the transaction log indicate that the transactions are not complete and also indicate the state of each of the transactions. The transaction manager either commits or rolls back the incomplete transaction based on the states of these transaction. After these transactions are resolved, the program code of the XAAS deallocate the connection handler and transaction identifiers for these transactions from the transaction log and ends the recovery operation. The process utilized to recover these transactions can be referred to as XA_RECOVER. FIG. 5 is a workflow that illustrates this recovery.

FIG. 5 is a workflow 500 that illustrates a recovery after an incomplete transaction in some embodiments of the present invention. As illustrated in FIG. 5, in some embodiments of the present invention, after a failure of a transaction manager, once the transaction manager is operational, it utilizes XAAS to recover incomplete transactions (510). For example, in some embodiments of the present invention, the transaction manager calls XA_RECOVER in the XAAS. Responsive to the call from the transaction manager to recover incomplete transactions, the program code of the XAAS accesses the transaction log and obtains (reads) the transaction identifiers and matching connection handlers (520). The program code of the XAAS initiates connections with the resources managers corresponding to the stored (incomplete) transactions in the transaction log (530). For each incomplete transaction, the program code either commits or rolls back the transaction by providing an instruction to the resource managers for the transaction, using the connection handler for that transaction (540). At the completion of each transaction, the program code deallocates the connection handler for the transaction and the transaction identifiers in the transaction log, and ends the recovery operation (550).

Figure 6:
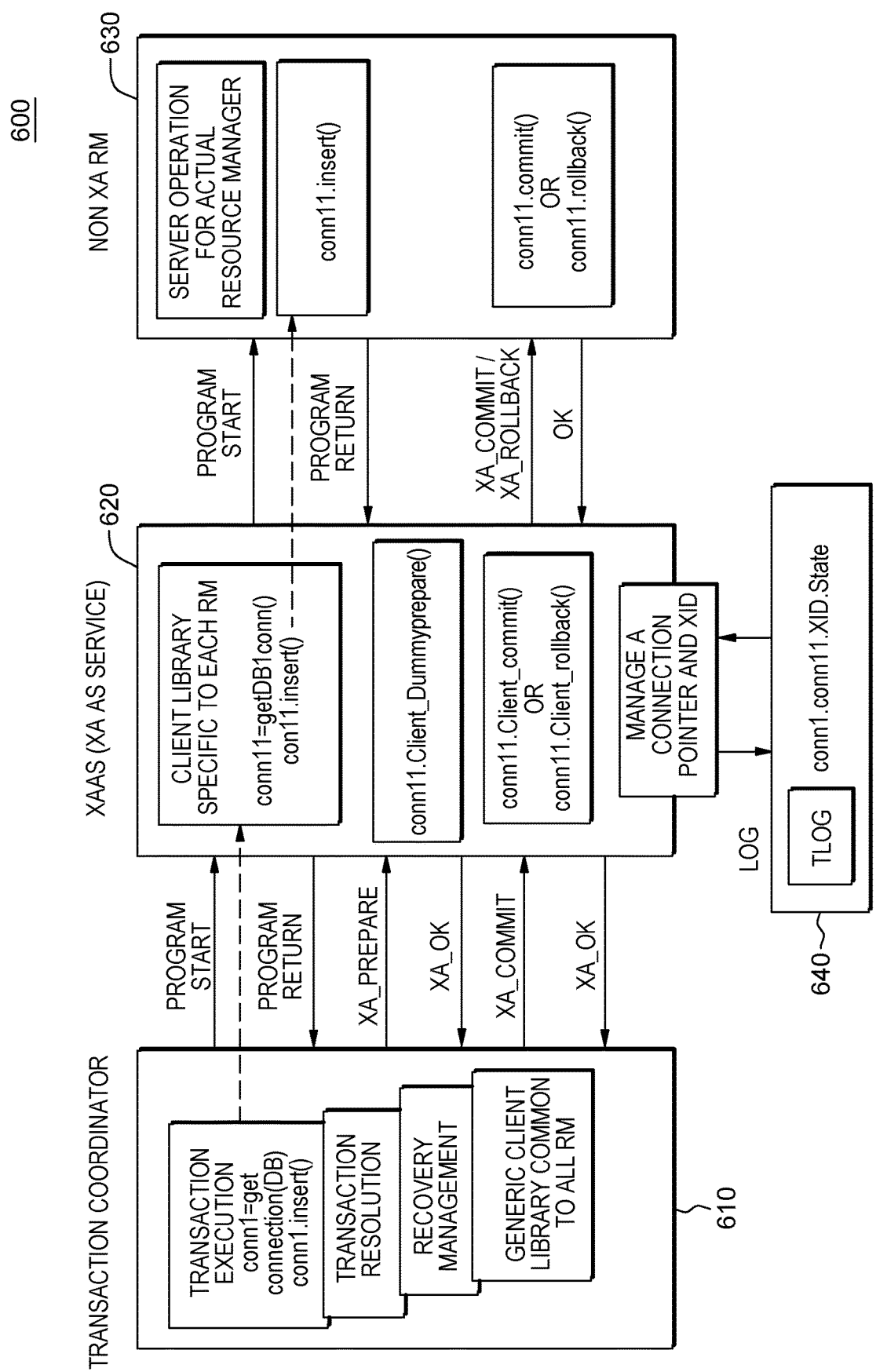
FIG. 6 is an illustration of various aspects of an environment in which aspects of embodiments of the present invention may be implemented.

FIG. 6 illustrates various aspects of a technical environment 600 into which elements of some embodiments of the present invention have been implemented. The technical environment includes a transaction coordinator 610, one or more resources executing XAAS 620, a resource manager that is not XA-compliant 630, and a transaction log 640. In general, FIG. 6 illustrates, how, in some embodiments of the present invention, when a transaction involves resource manager 630 that is not supported by the transaction manager 610, then all XA calls to it are forwarded to an XAAS 620, and XAAS manages the connection and transaction resolution.

As illustrated in FIG. 6, when a transaction manager, such as transaction coordinator 610 executes a transaction, the transaction manager tracks the resource managers, such as resource manager 630, involved. If there are no resource managers involved, the transaction manager executes the program because no recovery is needed. However, if the transaction coordinator 610 determines that a resource manager is involved (therefore meaning that the transaction will affect a resource), the transaction coordinator 610 determines if the resource manager is compliant with the transaction coordinator 610. In the technical environment of FIG. 6, the non-XA resource manager 630 is not compliant with the transaction coordinator 610.

As illustrated in FIG. 6, because the resource manager 630 is not supported by the transaction coordinator 610, rather than executing the program as usual (with a supported resource manager), the transaction coordinator 610 requests connection to the resource manager 630 from the XAAS 620, with an XA call. In the technical environment 600, the XAAS 620 is running in a highly available system.

Program code of the XAAS 620 generates (independently of the transaction coordinator 610) a connection with the resource manager 630. In some embodiments of the present invention, the program code of the XAAS maintains a pool of connections with the databases. Whether the connection is existing or newly formed, in response to the call from the transaction coordinator 610, the program code of the XAAS 620 returns a connection identifier (or the connection between the XAAS 620 and the resource manager 630) to the transaction coordinator 610.

In some embodiments of the present invention, as earlier discussed in FIG. 5, the program code of the XAAS 620 maintains its own log 640, referred to as a transaction log (TLOG) which contains the connection identifier of the connection between the XAAS and the transaction coordinator 610, the connection identifier of the connection generated (or utilized, if existing) between the XAAS 620 and the resource manager 630, a transaction identifier, and a state of the transaction. An example is provided in FIG. 6 of a record for a given transaction, including all these elements: conn1.conn11.XID.State.

Upon executing the transaction, the transaction coordinator 610 initiates a resolution to the resource manager 630, via the XAAS 620. The program code of the XAAS transforms all XA calls (e.g., prepare, commit, rollback) in the transaction from the transaction coordinator 610 to the calls compliant with (i.e., understood by) the resource manager 630. The program code of the XAAS also transforms the responses received from resource manager 630 into standard responses, which are understood by the transaction coordinator 610.

In some embodiments of the present invention, if a non-XA compliant database is the resource managed by the resource manager 630, the XAAS module is the last participant in the transaction. In some embodiments of the present invention, the last-participant element is pre-configured based on this scenario. A last-participant is a setup where the transaction coordinator 610 directly sends a "commit" to an identified participant without a "prepare." Skipping this prepare is an optimization and is executed after the transaction coordinator 610 receives a prepare response from all the other participants. If the resource manager is non-XA compliant, like the resource manager 630 in FIG. 6, then the transaction coordinator 610 considers the XAAS as a last participant. As such, the transaction coordinator 610 sends the first commit to the XAAS 620 (indirectly to the non-XA compliant resource manager 630), and based on the response, the transaction coordinator 610 sends the commit/rollback to other resource managers. In this non-limiting example, only one non-XA compliant resource manager 630 can be part of the transaction.

Embodiments of the present invention include a computer-implemented method, a computer program product, and a computer system, where program code executed by one or more processors (executing program code to provide extended architecture as a service) obtains a request from an extended architecture compliant transaction manager, to execute a transaction affecting a resource manager not supported by the transaction manager, wherein the resource managed by the resource manager is selected from the group consisting of: an extended architecture compliant resource, and an extended architecture non-compliant resource, where the request comprises a transaction identifier, and where the transaction comprises extended architecture compliant calls. The program code generates a connection, from the extended architecture as a service to the resource manager, where the connection comprises a connection identifier. The program code maintains, in a log, the connection identifier, the transaction identifier, and a state of the transaction. The program code executes the transaction on the resource managed by the resource manager, via the connection, the executing comprising: transforming the extended architecture compliant calls into calls in a format acceptable to the resource manager; transmitting the transformed calls to the resource manager, for execution on the resource; obtaining a response, from the resource manager, based on the execution on the resource of the transformed calls; transforming the response, from the format acceptable to the resource manager to an extended architecture compliant response; and transmitting the transformed response to the transaction manager.

In some embodiments of the present invention, the program code notifies the transaction manager of the connection identifier.

In some embodiments of the present invention, to generate the connection, the program code either initiates the connection between the extended architecture as a service to the resource manager, or the program code selects the connection from a pool of connections maintained by the between the extended architecture as a service and various resource managers including the resource manager.

In some embodiments of the present invention, the resource managed comprises the extended architecture non-compliant resource, and the program code obtains, from the transaction manager, based on the transaction manager obtaining the transformed response, a resolution call. The program code also transforms the resolution call by preparing and transmitting a dummy result to the transaction manager. Based on the dummy result, the program code obtains a transaction resolution command selected from the group consisting of: a transaction commit and a transaction rollback. The program code executes the transaction resolution command on the extended architecture non-compliant resource. The program code transmits a result of the executing to the transaction manager. In executing the transaction, the program code may utilize the connection identifier and the transaction identifier in the log to identify and execute the transaction.

In some embodiments of the present invention, the resource managed comprises the extended architecture compliant resource, and based on obtaining the response from the resource manager, the program code updates the state of the transaction in the log. The program code transmits the updated log to the transaction manager in a form readable by the transaction manager.

In some embodiments of the present invention, the program code obtains a second request from the extended architecture compliant transaction manager, to execute a new transaction affecting the resource manager not supported by the transaction manager, wherein the second request comprises a new transaction identifier. The program code generates a new connection, from the extended architecture as a service to the resource manager, where the new connection comprises a new connection identifier. The program code maintains, in the log, the new connection identifier, the new transaction identifier, and a state of the new transaction. The program code commences execution of the new transaction on the resource managed by the resource manager, via the new connection. The program code obtains an indication of a failure of the transaction manager. Based on obtaining the indication, the program code determines that the new transaction did not complete execution, based on the program code obtaining the state of the new transaction from the log, where the obtaining comprises identifying the new transaction based on the new connection identifier, the new transaction identifier; and the program code resolves the new transaction, where the resolving comprises executing a command selected from the group consisting of: a new transaction commit command and a new transaction rollback command. The program code may also deallocate the new connection, from the resource manager. The program code may also update the state of the new transaction in the log and transmit the updated log to the transaction manager in a form readable by the transaction manager.

In some embodiments of the present invention, the program code deallocates the connection, from the resource manager.

Referring now to FIG. 7, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, transaction manager 110 (FIG. 1), transaction coordinator 610 (FIG. 6), the resource managers 130 140 150 (FIG. 1), the resource manager 630, and the one or more computing resources executing XAAS 120 (FIG. 1 620 (FIG. 6) can each be understood as a cloud computing node 10 (FIG. 7) and if not a cloud computing node 10, then one or more general computing nodes that include aspects of the cloud computing node 10. Various of these resources may, together, comprise a hybrid cloud 105 (FIG. 1).

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
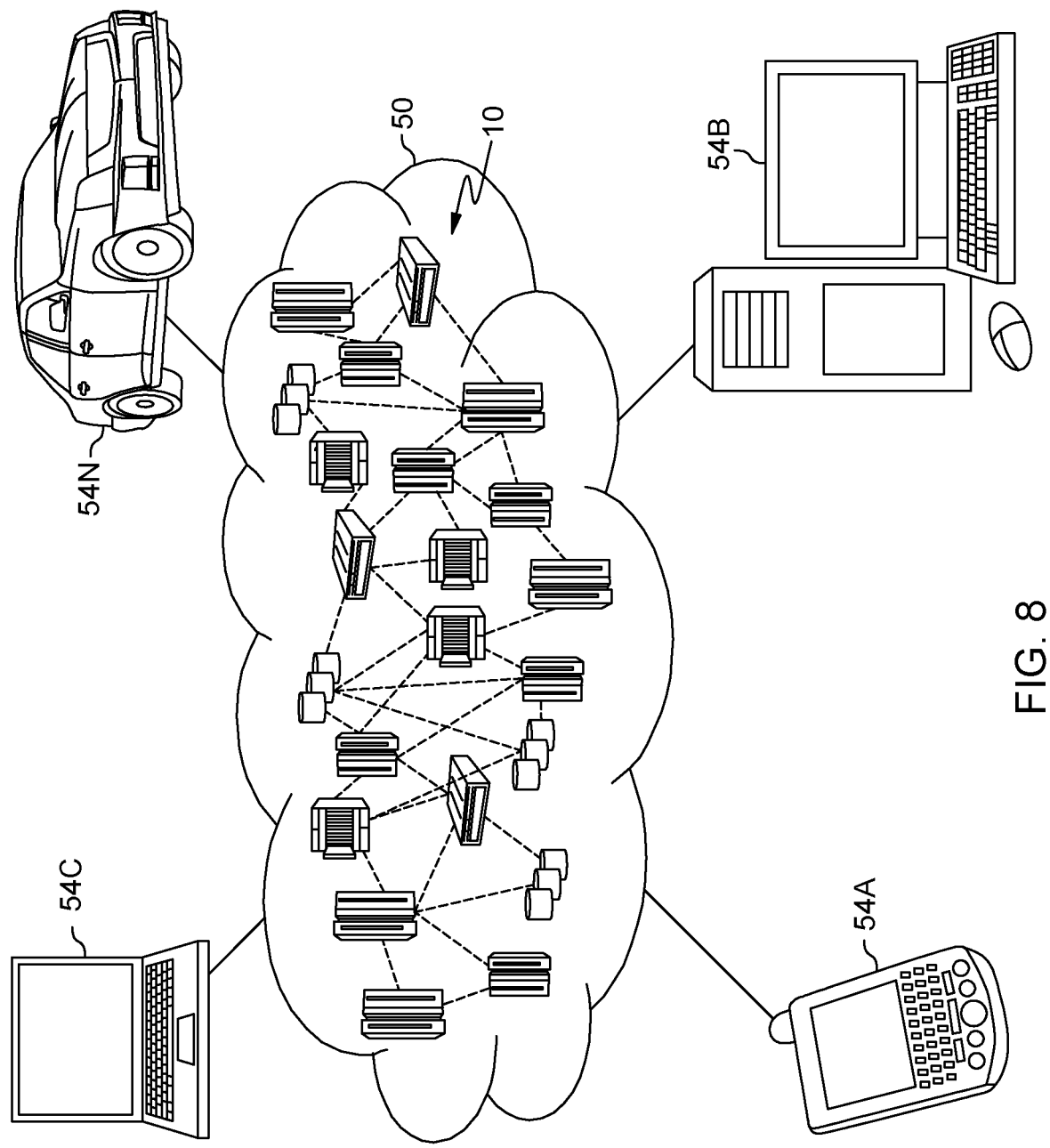
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
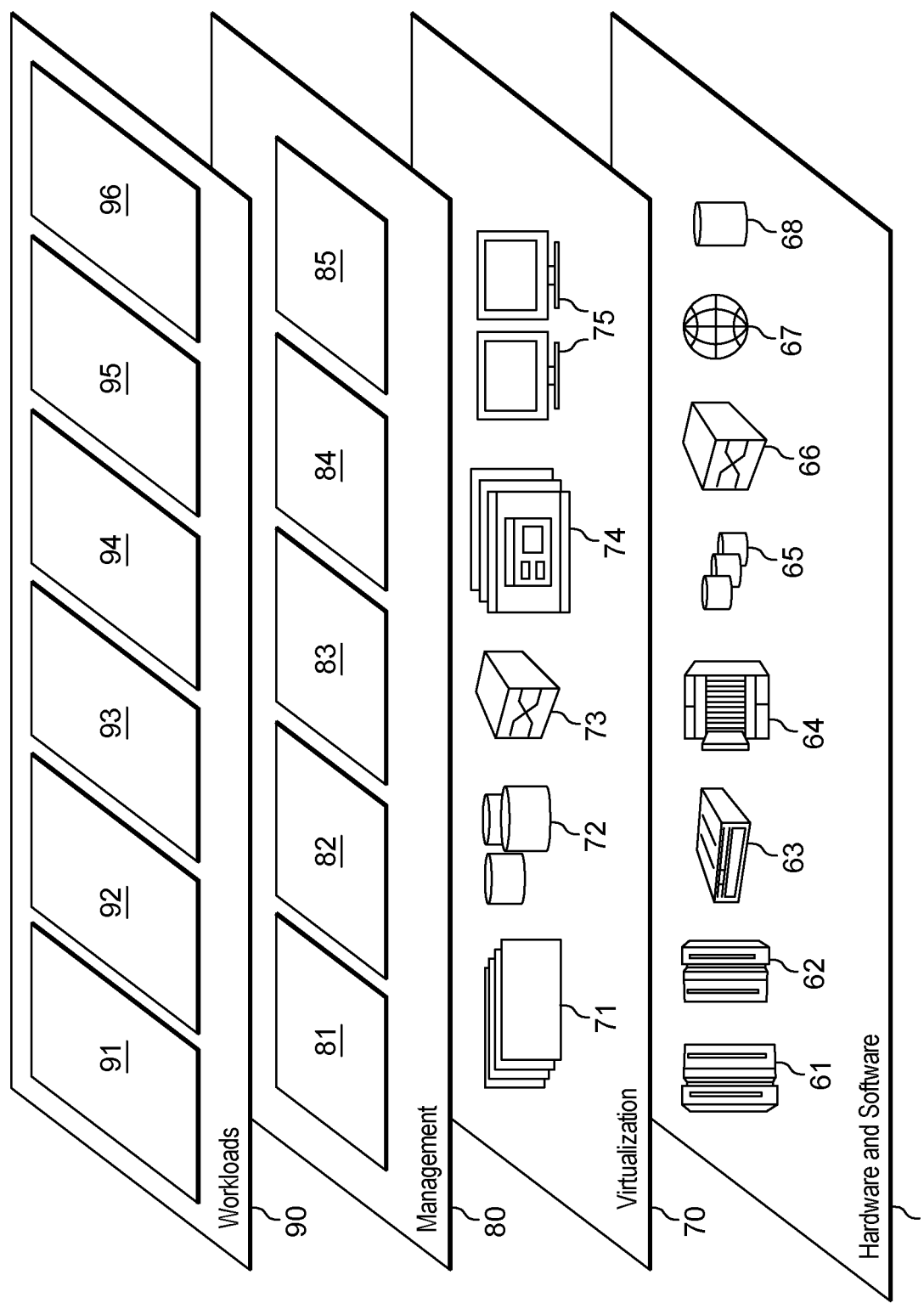
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performing a transaction utilizing a two-phase commit (2PC) in resources managed by both XA-compliant and non-compliant resource managers 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
obtaining, by one or more processors executing program code to provide extended architecture as a service, a request from an extended architecture compliant transaction manager, to execute a transaction affecting a resource manager not supported by the transaction manager, wherein the resource manager manages resources comprising at least one extended architecture compliant resource, and at least one extended architecture non-compliant resource, wherein the request comprises a transaction identifier, and wherein the transaction comprises extended architecture compliant calls;
generating, by the one or more processors, a connection, from the extended architecture as a service to the resource manager, wherein the connection comprises a connection identifier, wherein the connection comprises a common interface to integrate the at least one extended architecture compliant resource and the at least one extended architecture non-compliant resource with the resource manager;
maintaining, by the one or more processors, in a log, the connection identifier, the transaction identifier, and a state of the transaction;
executing, by the one or more processors, the transaction on the at least one extended architecture compliant resource of the resources managed by the resource manager, via the connection comprising the common interface, wherein executing the transaction comprises utilizing a two-phase commit protocol, the executing comprising:
 transforming, by the one or more processors, the extended architecture compliant calls into calls in a format acceptable to the resource manager;
 transmitting, by the one or more processors, the transformed calls to the resource manager, for execution on the resources;
 obtaining, by the one or more processors, a response, from the resource manager, based on the execution on the resources of the transformed calls;
 transforming, by the one or more processors, the response, from the format acceptable to the resource manager to an extended architecture compliant response; and
 transmitting, by the one or more processors, the transformed response to the transaction manager via the connection comprising the common interface;
executing, by the one or more processors, the transaction on the at least one the extended architecture non-compliant resource of the resources managed by the resource manager, via the connection comprising the common interface, wherein executing the transaction comprises utilizing a two-phase commit protocol, the executing comprising:
 obtaining, by the one or more processors, from the transaction manager, based on the transaction manager obtaining the transformed response, a resolution call;
 transforming, by the one or more processors, the resolution call by preparing and transmitting a dummy result to the transaction manager;
 based on the dummy result, obtaining, by the one or more processors, a transaction resolution command selected from the group consisting of: a transaction commit and a transaction rollback;
 executing, by the one or more processors, the transaction resolution command on the extended architecture non-compliant resource, via the connection comprising the common interface; and
 transmitting, by the one or more processors, a result of the executing to the transaction manager via the connection comprising the common interface.

2. The computer-implemented method of claim 1, further comprising:
notifying, by the one or more processors, the transaction manager of the connection identifier.

3. The computer-implemented method of claim 1, wherein generating the connection comprises:
initiating, by the one or more processors, the connection between the extended architecture as a service to the resource manager, or
selecting, by the one or more processors, the connection from a pool of connections maintained by the between the extended architecture as a service and various resource managers including the resource manager.

4. The computer-implemented method of claim 1, wherein the executing the transaction resolution command on the at least one extended architecture non-compliant resource comprises utilizing the connection identifier and the transaction identifier in the log to identify and execute the transaction.

5. The computer-implemented method of claim 1, wherein executing the transaction on the at least one extended architecture compliant resource, further comprises:
based on obtaining the response from the resource manager, updating, by the one or more processors, the state of the transaction in the log; and
transmitting, by the one or more processors, the updated log to the transaction manager in a form readable by the transaction manager.

6. The computer-implemented method of claim 1, further comprising:
obtaining, by the one or more processors, a second request from the extended architecture compliant transaction manager, to execute a new transaction affecting the resource manager not supported by the transaction manager, wherein the second request comprises a new transaction identifier;
generating, by the one or more processors, a new connection, from the extended architecture as a service to the resource manager, wherein the new connection comprises a new connection identifier;
maintaining, by the one or more processors, in the log, the new connection identifier, the new transaction identifier, and a state of the new transaction;
commencing execution, by the one or more processors, of the new transaction on the resources managed by the resource manager, via the new connection;
obtaining, by the one or more processors, an indication of a failure of the transaction manager;
based on obtaining the indication, determining, by the one or more processors, that the new transaction did not complete execution, based on obtaining, by the one or more processors, the state of the new transaction from the log, wherein the obtaining comprises identifying the new transaction based on the new connection identifier, the new transaction identifier; and
resolving, by the one or more processors, the new transaction, wherein the resolving comprises executing a command selected from the group consisting of: a new transaction commit command and a new transaction rollback command.

7. The computer-implemented method of claim 6, further comprising:
   deallocating, by the one or more processors, the new connection, from the resource manager.

8. The computer-implemented method of claim 6, further comprising:
   updating, by the one or more processors, the state of the new transaction in the log; and
   transmitting, by the one or more processors, the updated log to the transaction manager in a form readable by the transaction manager.

9. The computer-implemented method of claim 1, further comprising:
   deallocating, by the one or more processors, the connection, from the resource manager.

10. A computer program product comprising:
    a computer readable storage medium readable by one or more processors and storing instructions for execution by the one or more processors for performing a method comprising:
       obtaining, by the one or more processors executing program code to provide extended architecture as a service, a request from an extended architecture compliant transaction manager, to execute a transaction affecting a resource manager not supported by the transaction manager, wherein the resource manager manages resources comprising at least one extended architecture compliant resource, and at least one extended architecture non-compliant resource, wherein the request comprises a transaction identifier, and wherein the transaction comprises extended architecture compliant calls;
       generating, by the one or more processors, a connection, from the extended architecture as a service to the resource manager, wherein the connection comprises a connection identifier, wherein the connection comprises a common interface to integrate the at least one extended architecture compliant resource and the at least one extended architecture non-compliant resource with the resource manager;
       maintaining, by the one or more processors, in a log, the connection identifier, the transaction identifier, and a state of the transaction;
       executing, by the one or more processors, the transaction on the at least one extended architecture compliant resource of the resources managed by the resource manager, via the connection comprising the common interface, wherein executing the transaction comprises utilizing a two-phase commit protocol, the executing comprising:
          transforming, by the one or more processors, the extended architecture compliant calls into calls in a format acceptable to the resource manager;
          transmitting, by the one or more processors, the transformed calls to the resource manager, for execution on the resources;
          obtaining, by the one or more processors, a response, from the resource manager, based on the execution on the resources of the transformed calls;
          transforming, by the one or more processors, the response, from the format acceptable to the resource manager to an extended architecture compliant response; and
          transmitting, by the one or more processors, the transformed response to the transaction manager via the connection comprising the common interface;
       executing, by the one or more processors, the transaction on the at least one the extended architecture non-compliant resource of the resources managed by the resource manager, via the connection comprising the common interface, wherein executing the transaction comprises utilizing a two-phase commit protocol, the executing comprising:
          obtaining, by the one or more processors, from the transaction manager, based on the transaction manager obtaining the transformed response, a resolution call;
          transforming, by the one or more processors, the resolution call by preparing and transmitting a dummy result to the transaction manager;
          based on the dummy result, obtaining, by the one or more processors, a transaction resolution command selected from the group consisting of: a transaction commit and a transaction rollback;
          executing, by the one or more processors, the transaction resolution command on the extended architecture non-compliant resource, via the connection comprising the common interface; and
          transmitting, by the one or more processors, a result of the executing to the transaction manager via the connection comprising the common interface.

11. The computer program product of claim 10, the method further comprising:
    notifying, by the one or more processors, the transaction manager of the connection identifier.

12. The computer program product of claim 10, wherein generating the connection comprises:
    initiating, by the one or more processors, the connection between the extended architecture as a service to the resource manager, or
    selecting, by the one or more processors, the connection from a pool of connections maintained by the between the extended architecture as a service and various resource managers including the resource manager.

13. The computer program product of claim 10, wherein the executing the transaction resolution command on the at least one extended architecture non-compliant resource comprises utilizing the connection identifier and the transaction identifier in the log to identify and execute the transaction.

14. The computer program product of claim 10, wherein executing the transaction on the at least one extended architecture compliant resource, further comprises:
    based on obtaining the response from the resource manager, updating, by the one or more processors, the state of the transaction in the log; and
    transmitting, by the one or more processors, the updated log to the transaction manager in a form readable by the transaction manager.

15. The computer program product of claim 10, further comprising:
    obtaining, by the one or more processors, a second request from the extended architecture compliant transaction manager, to execute a new transaction affecting the resource manager not supported by the transaction manager, wherein the second request comprises a new transaction identifier;
    generating, by the one or more processors, a new connection, from the extended architecture as a service to the resource manager, wherein the new connection comprises a new connection identifier;

maintaining, by the one or more processors, in the log, the new connection identifier, the new transaction identifier, and a state of the new transaction;

commencing execution, by the one or more processors, of the new transaction on the resources managed by the resource manager, via the new connection;

obtaining, by the one or more processors, an indication of a failure of the transaction manager;

based on obtaining the indication, determining, by the one or more processors, that the new transaction did not complete execution, based on obtaining, by the one or more processors, the state of the new transaction from the log, wherein the obtaining comprises identifying the new transaction based on the new connection identifier, the new transaction identifier; and resolving, by the one or more processors, the new transaction, wherein the resolving comprises executing a command selected from the group consisting of: a new transaction commit command and a new transaction rollback command.

16. The computer program product of claim 15, further comprising:

deallocating, by the one or more processors, the new connection, from the resource manager.

17. The computer program product of claim 15, further comprising:

updating, by the one or more processors, the state of the new transaction in the log; and transmitting, by the one or more processors, the updated log to the transaction manager in a form readable by the transaction manager.

18. A system comprising:

a memory;

one or more processors in communication with the memory;

program instructions executable by the one or more processors via the memory to perform a method, the method comprising:

obtaining, by the one or more processors executing program code to provide extended architecture as a service, a request from an extended architecture compliant transaction manager, to execute a transaction affecting a resource manager not supported by the transaction manager, wherein the resource manager manages resources comprising at least one extended architecture compliant resource, and at least one extended architecture non-compliant resource, wherein the request comprises a transaction identifier, and wherein the transaction comprises extended architecture compliant calls;

generating, by the one or more processors, a connection, from the extended architecture as a service to the resource manager, wherein the connection comprises a connection identifier, wherein the connection comprises a common interface to integrate the at least one extended architecture compliant resource and the at least one extended architecture non-compliant resource with the resource manager;

maintaining, by the one or more processors, in a log, the connection identifier, the transaction identifier, and a state of the transaction;

executing, by the one or more processors, the transaction on the at least one extended architecture compliant resource of the resources managed by the resource manager, via the connection comprising the common interface, wherein executing the transaction comprises utilizing a two-phase commit protocol, the executing comprising:

transforming, by the one or more processors, the extended architecture compliant calls into calls in a format acceptable to the resource manager;

transmitting, by the one or more processors, the transformed calls to the resource manager, for execution on the resources;

obtaining, by the one or more processors, a response, from the resource manager, based on the execution on the resources of the transformed calls;

transforming, by the one or more processors, the response, from the format acceptable to the resource manager to an extended architecture compliant response; and transmitting, by the one or more processors, the transformed response to the transaction manager via the connection comprising the common interface;

executing, by the one or more processors, the transaction on the at least one the extended architecture non-compliant resource of the resources managed by the resource manager, via the connection comprising the common interface, wherein executing the transaction comprises utilizing a two-phase commit protocol, the executing comprising:

obtaining, by the one or more processors, from the transaction manager, based on the transaction manager obtaining the transformed response, a resolution call;

transforming, by the one or more processors, the resolution call by preparing and transmitting a dummy result to the transaction manager;

based on the dummy result, obtaining, by the one or more processors, a transaction resolution command selected from the group consisting of: a transaction commit and a transaction rollback;

executing, by the one or more processors, the transaction resolution command on the extended architecture non-compliant resource, via the connection comprising the common interface; and transmitting, by the one or more processors, a result of the executing to the transaction manager via the connection comprising the common interface.

19. The computer-implemented method of claim 1, further comprising:

during the executing of the transaction on the at least one the extended architecture non-compliant resource or on the at least one extended architecture compliant resource, determining, by the one or more processors, that the transaction manager has become non-responsive;

reading, by the one or more processors, the state of the transaction in the log;

resolving, by the one or more processors, the transaction based on the state of the transaction in the log; and based on resolving the transaction, deallocating, by the one or more processors, the connection and the transaction identifier from the transaction.

* * * * *